(12) United States Patent
Kuwu (10) Patent No.: US 8,729,812 B2
(45) Date of Patent: May 20, 2014

(54) LIGHTING DEVICE HAVING MULTIPLE LIGHT EMITTING DIODE UNITS OF DIFFERENT COLOR TEMPERATURE

(76) Inventor: Chao-Li Kuwu, Taipei (TW)

( * ) Notice: Subject to any disclaimer, the term of this patent is extended or adjusted under 35 U.S.C. 154(b) by 438 days.

(21) Appl. No.: 13/213,588

(22) Filed: Aug. 19, 2011

(65) Prior Publication Data

US 2013/0043801 A1 Feb. 21, 2013

(51) Int. Cl.
*H05B 37/02* (2006.01)

(52) U.S. Cl.
USPC ........... 315/219; 315/247; 315/291; 315/299; 315/360; 315/362

(58) Field of Classification Search
CPC ............... H05B 37/02; H05B 33/0803; H05B 33/0806; H05B 33/0896
USPC ............. 315/149, 152, 153, 193, 194, 209 R, 315/210, 219, 246, 247, 291, 299, 360, 362
See application file for complete search history.

(56) References Cited

U.S. PATENT DOCUMENTS

| | | | |
|---|---|---|---|
| 7,288,902 B1 * | 10/2007 | Melanson | 315/291 |
| 8,018,171 B1 * | 9/2011 | Melanson et al. | 315/194 |
| 8,022,634 B2 * | 9/2011 | Greenfeld | 315/192 |
| 2008/0224631 A1 * | 9/2008 | Melanson | 315/291 |

* cited by examiner

*Primary Examiner* — Thuy Vinh Tran
(74) *Attorney, Agent, or Firm* — WPAT, PC; Justin King (57) ABSTRACT

A lighting device includes a lighting part, a switching part and a luminance fine-tuning part. The lighting part at least includes a first light emitting diode unit for outputting light with a first color temperature and a second light emitting diode unit for outputting light with a second color temperature. The switching part is coupled with a power source. By changing the number of times the switching part is turned on, the light with desired color temperature and luminance is produced by the lighting part according to the user's requirements. By operating the luminance fine-tuning part, the selected luminance is slightly increased or decreased.

20 Claims, 11 Drawing Sheets

LIGHTING DEVICE HAVING MULTIPLE LIGHT EMITTING DIODE UNITS OF DIFFERENT COLOR TEMPERATURE

FIELD OF THE INVENTION

The present invention relates to a lighting device, and more particularly to a color-temperature and luminance adjustable lighting device.

BACKGROUND OF THE INVENTION

In recent years, light emitting diodes (LEDs) are widely used in daily lives because of many benefits and advantages such as power-saving efficacy. Until now, LEDs are widely used in many aspects such as display screens, household electrical appliances, vehicle electronic components, lighting device, and the like. Take a household lighting device using the LED as the light source for example. In comparison with the conventional incandescent lights and fluorescent lamps, LED has shorter warm-up time, quicker response speed, smaller size, longer life, higher power-saving efficacy, better shock resistance, lower contamination, higher reliability and higher productivity. With the maturity of the LED technology, LEDs will replace the conventional incandescent lights and fluorescent lamps.

As known, the current lighting device using the LED as the light source can produce light with a single color temperature. That is, the color temperature of the light source is mainly dependent on the LED of the lighting device. In addition, the color temperature of the LED is dependent on the fluorescent material contained in the LED. The fluorescent material to be added to the LED of the lighting device is determined before the LED is fabricated. Unless the LED of the lighting device is replaced with a new one, it is impossible to adjust the color temperature of the light outputted from the light source during the process of using the lighting device.

As known, it is inconvenient for the user to use the conventional lighting device. For example, if the light outputted from the LED has higher color temperature, the light feels harsh and cold to the eyes of the user. Since the color temperature of the light fails to be adjusted by the user, the light may discomfort or hurt the user's eyes. That is, the operations of the conventional lighting device are not user-friendly. Therefore, there is a need of providing an improved lighting device to obviate the drawbacks encountered from the prior art.

SUMMARY OF THE INVENTION

The present invention provides a lighting device for producing light with adjustable color temperature and luminance by changing the number of times a switching element is turned on.

In accordance with an aspect of the present invention, there is provided a lighting device. The lighting device includes a light source, a color-temperature adjustable module and a luminance adjustable module. The light source at least includes a first light emitting diode unit for outputting light with a first color temperature and a second light emitting diode unit for outputting light with a second color temperature. The color-temperature adjustable module includes a switching element and a driving device. The switching element is coupled with a power source. The driving device is electrically connected between the switching element and the light source. According to a number of times the switching element is turned on, the driving device generates a first enabling signal to the first light emitting diode unit and/or generates a second enabling signal to the second light emitting diode unit. The first light emitting diode unit provides a first luminance with the first color temperature in response to the first enabling signal, and/or the second light emitting diode unit provides a second luminance with the second color temperature in response to the second enabling signal. The luminance adjustable module is used for fine tuning the first luminance and/or the second luminance outputted from the color-temperature adjustable module, thereby slightly increasing or decreasing the first luminance and/or the second luminance.

In an embodiment, the driving device includes a count controller and a driving circuit. The count controller is used for counting the number of times the switching element is turned on, thereby correspondingly outputting the first enabling signal to the first light emitting diode unit and/or outputting the second enabling signal to the second light emitting diode unit. The driving circuit is used for driving illumination of the first light emitting diode unit to provide the first luminance with the first color temperature and/or driving illumination of the second light emitting diode unit to provide the second luminance with the second color temperature.

In an embodiment, the count controller comprises a programmed micro controller or a flip-flop.

In an embodiment, if the duration of the switching element in an off state exceeds a specified time period, the number of times the switching element is turned on is re-counted by the count controller.

In an embodiment, the count controller includes a capacitor for providing electricity to maintain a normal operation of the count controller within the specified time period.

In an embodiment, the count controller further issues a light-adjusting signal according to the number of times the switching element is turned on. The driving device further includes a pulse width modulation controller for receiving the light-adjusting signal and generating a driving signal in response to the light-adjusting signal. In response to the driving signal, the light source is driven by the driving circuit to provide a corresponding luminance.

In an embodiment, the driving signal is a pulse width modulation signal with a 100% duty cycle, a pulse width modulation signal with an 80% duty cycle, a pulse width modulation signal with a 75% duty cycle, a pulse width modulation signal with a 60% duty cycle or a pulse width modulation signal with a 50% duty cycle.

In an embodiment, if the first luminance and the second luminance are identical, the first light emitting diode unit and the second light emitting diode unit are simultaneously driven in response to the driving signal. Whereas, if the first luminance and the second luminance are different, either the first light emitting diode unit or the second light emitting diode unit is driven in response to the driving signal.

In an embodiment, the lighting device is used in an indoor lighting application, and the lighting device is a household lighting lamp, a commercial lighting lamp, a reading lamp or a bedside lamp.

In an embodiment, the first light emitting diode unit and the second light emitting diode unit collectively include at least three light emitting diodes, and the light emitting diodes are symmetrically arranged with respect to a symmetry axis, so that every two light emitting diodes symmetrically arranged at opposite sides of the symmetry axis output light with the same color temperature. The light emitting diodes of a light emitting diode arrangement group at each side of the symmetry axis are divided into at least two light emitting diode arrangement subgroups, wherein every two adjacent light emitting diodes of each light emitting diode arrangement subgroup output light with different color temperatures.

In an embodiment, the light emitting diodes of each light emitting diode arrangement subgroup are linearly or non-linearly arranged.

In an embodiment, every two adjacent light emitting diodes arranged at a periphery of the light emitting diodes output light with different color temperatures.

In an embodiment, the first light emitting diode unit and the second light emitting diode unit collectively include at least three light emitting diodes. If the light emitting diodes are arranged in an array, every two adjacent light emitting diodes output light with different color temperatures. Whereas, if the light emitting diodes are arranged in a non-array, the light emitting diodes are divided into at least two light emitting diode arrangement groups, all light emitting diodes of each light emitting diode arrangement group are linearly arranged, and every two adjacent light emitting diodes of each light emitting diode arrangement group output light with different color temperatures.

In an embodiment, every two light emitting diode arrangement groups are parallel with each other or not parallel with each other, and/or every two adjacent light emitting diodes arranged at a periphery of the light emitting diodes output light with different color temperatures.

In an embodiment, the light emitting diodes are symmetrically arranged with respect to a symmetry axis, so that every two light emitting diodes symmetrically arranged at opposite sides of the symmetry axis output light with the same color temperature.

In an embodiment, the luminance adjustable module further includes a variable resistor, wherein the first luminance and/or the second luminance is increased or decreased by changing a resistance value of the variable resistor.

In an embodiment, the luminance adjustable module further includes a knob-type controlling element, wherein when the knob-type controlling element is rotated by a user, the resistance value of the variable resistor is changeable.

In accordance with another aspect of the present invention, there is provided a lighting device. The lighting device includes a lighting part, a switching part and a luminance fine-tuning part. The lighting part at least includes a first light emitting diode unit, a second light emitting diode unit and a driving device. The first light emitting diode unit is used for outputting light with a first color temperature. The second light emitting diode unit is used for outputting light with a second color temperature. The driving device is used for driving illumination of the first light emitting diode unit to provide a first luminance with the first color temperature and/or driving illumination of the second light emitting diode unit to provide the second luminance with the second color temperature. The switching part is coupled with a power source and electrically connected with the lighting part. When the switching part is turned on for a specified number of times by a user, the first luminance with the first color temperature, the second luminance with the second color temperature or a third luminance with a combination of the first color temperature and the second color temperature is selectively outputted from the lighting part. After one of the first luminance, the second luminance and the third luminance is selected by the user, the selected one of the first luminance, the second luminance and the third luminance is slightly increased or decreased by operating the luminance fine-tuning part.

In an embodiment, the driving device includes a count controller and a driving circuit. The count controller is used for counting the number of times the switching part is turned on, thereby outputting the first enabling signal to the first light emitting diode unit and/or outputting the second enabling signal to the second light emitting diode unit. The driving circuit is used for driving illumination of the first light emitting diode unit to provide the first luminance with the first color temperature and/or driving illumination of the second light emitting diode unit to provide the second luminance with the second color temperature. The first light emitting diode unit provides the first luminance with the first color temperature in response to the first enabling signal, and/or the second light emitting diode unit provides the second luminance with the second color temperature in response to the second enabling signal.

In an embodiment, the count controller includes a programmed micro controller or a flip-flop.

In an embodiment, if the duration of the switching part in an off state exceeds a specified time period, the number of times the switching element is turned on is re-counted by the count controller.

In an embodiment, the count controller includes a capacitor for providing electricity to maintain a normal operation of the count controller within the specified time period.

In an embodiment, the count controller further issues a light-adjusting signal according to the number of times the switching part is turned on. The driving device further includes a pulse width modulation controller for receiving the light-adjusting signal and generating a driving signal in response to the light-adjusting signal. In response to the driving signal, the lighting part is driven by the driving circuit to provide a corresponding luminance.

In an embodiment, the driving signal is a pulse width modulation signal with a 100% duty cycle, a pulse width modulation signal with an 80% duty cycle, a pulse width modulation signal with a 75% duty cycle, a pulse width modulation signal with a 60% duty cycle or a pulse width modulation signal with a 50% duty cycle.

In an embodiment, if the first luminance and the second luminance are identical, the first light emitting diode unit and the second light emitting diode unit are simultaneously driven in response to the driving signal. Whereas, if the first luminance and the second luminance are different, either the first light emitting diode unit or the second light emitting diode unit is driven in response to the driving signal.

In an embodiment, the lighting device is used in an indoor lighting application, and the lighting device is a household lighting lamp, a commercial lighting lamp, a reading lamp or a bedside lamp.

In an embodiment, the first light emitting diode unit and the second light emitting diode unit collectively include at least three light emitting diodes, and the light emitting diodes are symmetrically arranged with respect to a symmetry axis, so that every two light emitting diodes symmetrically arranged at opposite sides of the symmetry axis output light with the same color temperature. The light emitting diodes of a light emitting diode arrangement group at each side of the symmetry axis are divided into at least two light emitting diode arrangement subgroups, wherein every two adjacent light emitting diodes of each light emitting diode arrangement subgroup output light with different color temperatures.

In an embodiment, the light emitting diodes of each light emitting diode arrangement subgroup are linearly or non-linearly arranged.

In an embodiment, every two adjacent light emitting diodes arranged at a periphery of the light emitting diodes output light with different color temperatures.

In an embodiment, the first light emitting diode unit and the second light emitting diode unit collectively include at least three light emitting diodes. If the light emitting diodes are arranged in an array, every two adjacent light emitting diodes output light with different color temperatures. Whereas, if the light emitting diodes are arranged in a non-array, the light emitting diodes are divided into at least two light emitting diode arrangement groups, all light emitting diodes of each light emitting diode arrangement group are linearly arranged, and every two adjacent light emitting diodes of each light emitting diode arrangement group output light with different color temperatures.

In an embodiment, every two light emitting diode arrangement groups are parallel with each other or not parallel with each other, and/or every two adjacent light emitting diodes arranged at a periphery of the light emitting diodes output light with different color temperatures.

In an embodiment, the light emitting diodes are symmetrically arranged with respect to a symmetry axis, so that every two light emitting diodes symmetrically arranged at opposite sides of the symmetry axis output light with the same color temperature.

In an embodiment, the luminance fine-tuning part is a knob-type controlling element. When the knob-type controlling element is rotated by the user, the resistance value of the variable resistor is changeable.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
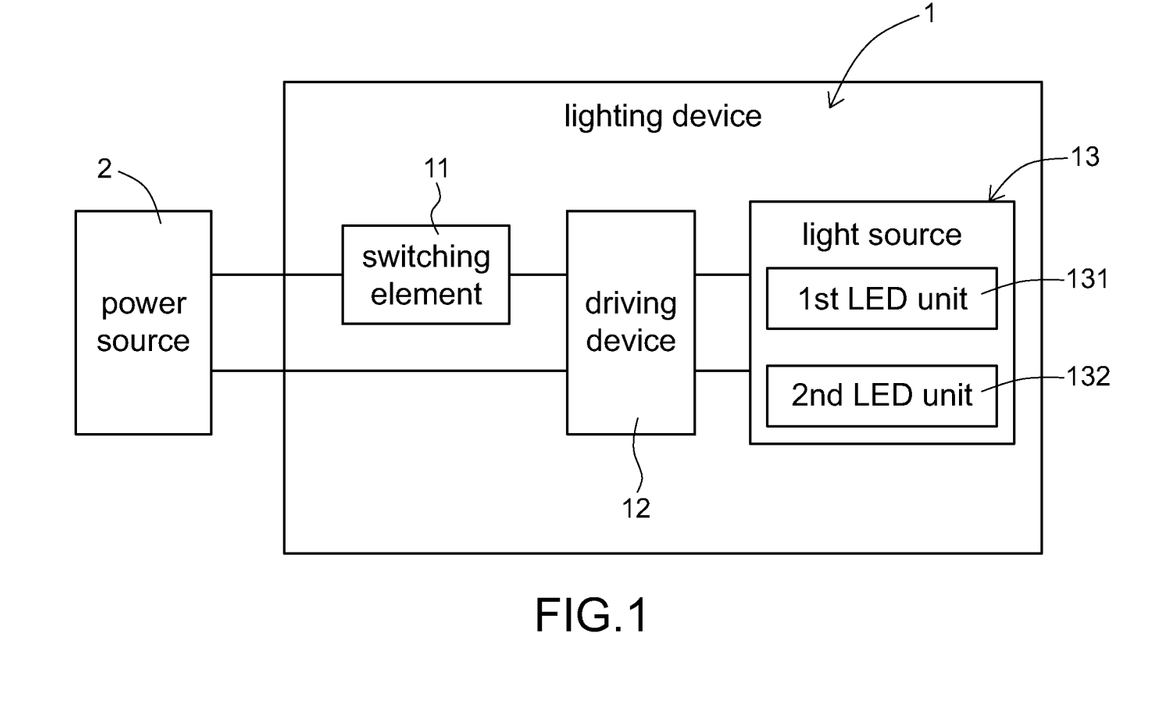
FIG. 1 is a schematic functional block diagram illustrating the concept of a lighting device according to a first embodiment of the present invention.
Figure 2:
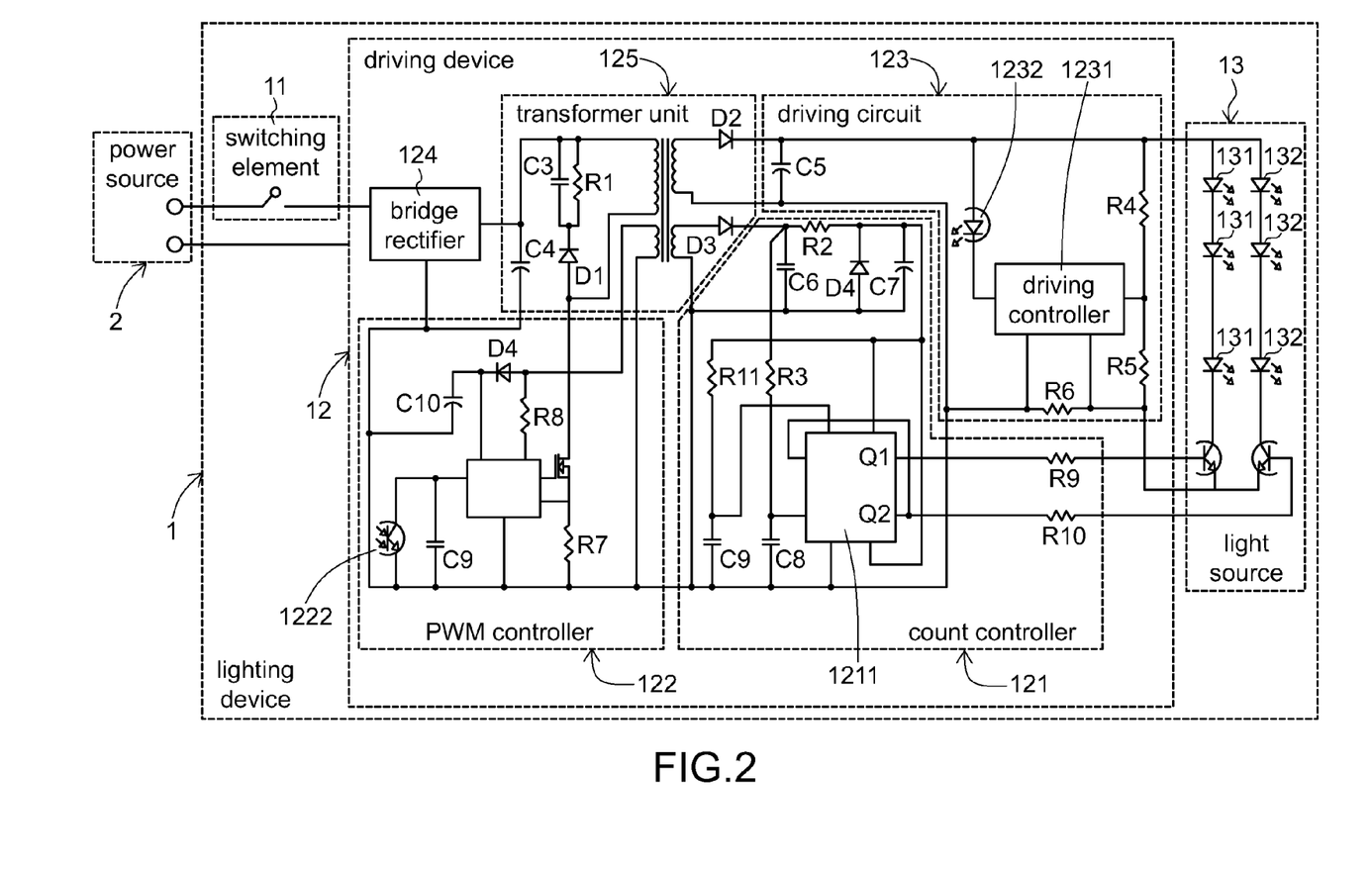
FIG. 2 schematically illustrating an exemplary lighting circuit of the lighting device of FIG. 1.
Figure 3:
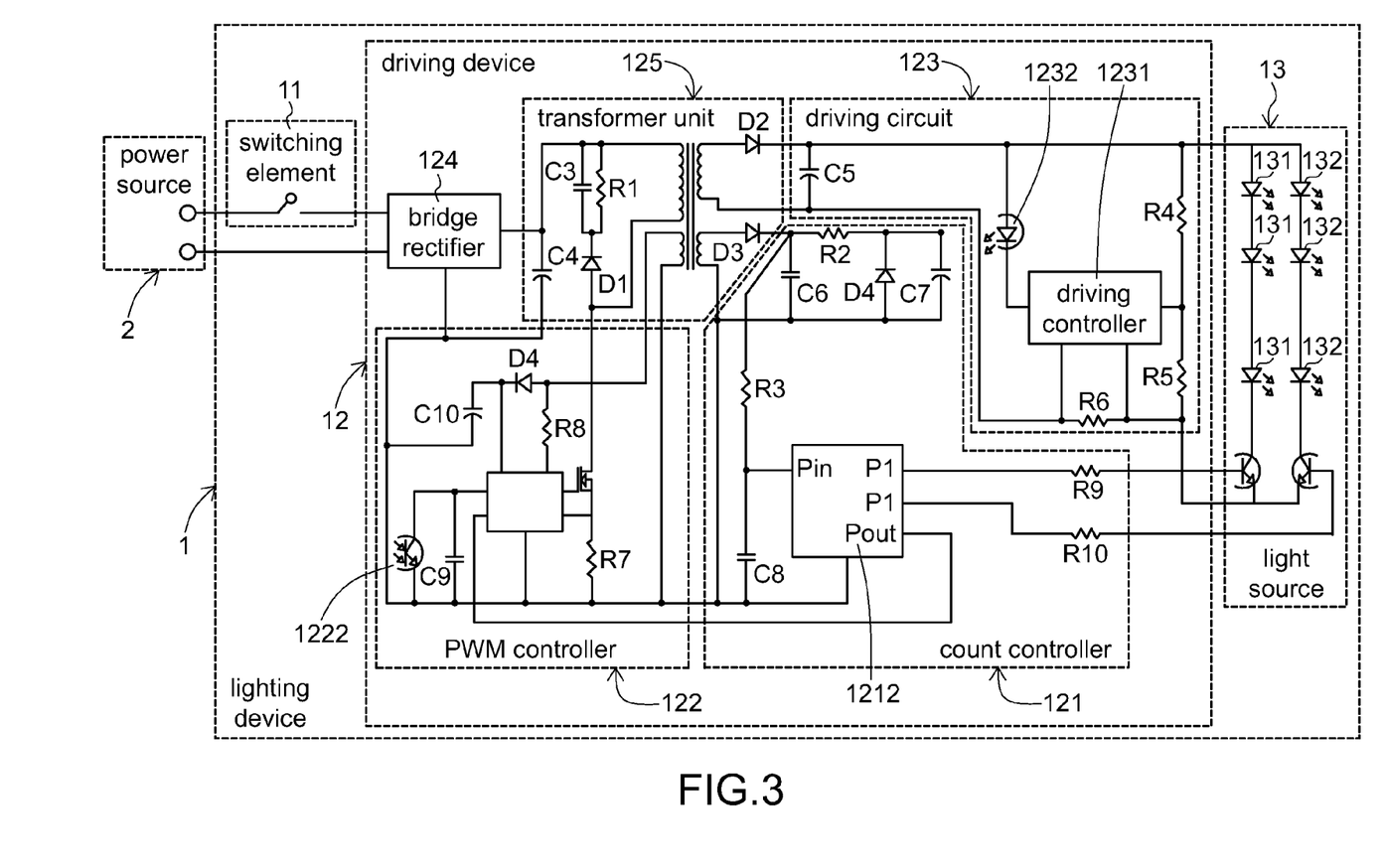
FIG. 3 schematically illustrating another exemplary lighting circuit of the lighting device of FIG. 1.

FIG. 1 is a schematic functional block diagram illustrating the concept of a lighting device according to a first embodiment of the present invention. FIG. 2 schematically illustrating an exemplary lighting circuit of the lighting device of FIG. 1. FIG. 3 schematically illustrating another exemplary lighting circuit of the lighting device of FIG. 1.

Please refer to FIGS. 1, 2 and 3. The lighting device 1 comprises a switching element 11, a driving device 12 and a light source 13. The light source 13 comprises at least a first LED unit 131 and at least a second LED unit 132. The first LED unit 131 is configured for outputting light with a first color temperature, and the second LED unit 132 is configured for outputting light with a second color temperature. In the first embodiment, the light with the first color temperature is cold white light with a color temperature of 6000K, and the light with the second color temperature is warm white light with a color temperature of 3000K. Moreover, the switching element 11 is coupled with a power source 2, and the driving device 12 is electrically connected between the switching element 11 and the light source 13. In a case that the switching element 11 is turned on, the electricity provided by the power source 2 will allow the driving device 12 to drive illumination of the first LED unit 131 and/or the second LED unit 132. Whereas, in a case that the switching element 11 is turned off, the power source 2 fails to provide electricity to the driving device 12, and thus the first LED unit 131 and the second LED unit 132 go off.

The driving device 12 comprises a count controller 121, a pulse width modulation controller 122, a driving circuit 123, a bridge rectifier 124 and a transformer unit 125. In a case that the switching element 11 is turned on, an AC voltage from the power source 2 is converted into a DC voltage by the bridge rectifier 124, and the DC voltage is transmitted to associated components of the driving device 12. Moreover, according to the number of times the switching element 11 is turned on, the driving device 12 correspondingly generates a first enabling signal to the first LED unit 131 and/or generates a second enabling signal the second LED unit 132. In response to the first enabling signal, the first LED unit 131 provides a first luminance with a first color temperature. Whereas, in response to the second enabling signal, the second LED unit 132 provides a second luminance with a second color temperature.

In the exemplary lighting circuit as shown in FIG. 2, the count controller 121 comprises a flip-flop 1211 with a first pin Q1 and a second pin Q2. The count controller 121 is used for counting the number of times the switching element 11 is turned on. According to the number of times the switching element 11 is turned on, only the first enabling signal is outputted from the first pin Q1, or only the second enabling signal is outputted from the second pin Q2, or both the first enabling signal and the second enabling signal are respectively outputted from the first pin Q1 and the second pin Q2. Moreover, the driving circuit 123 comprises a driving controller 1231, a photo coupler 1232, a capacitor C5 and a plurality of resistors R4~R6. After the switching element 11 is turned on, the pulse width modulation controller 122 outputs a pulse width modulation signal with a specified duty cycle to the driving circuit 123. In response to the pulse width modulation signal pulse width modulation signal, the driving device 12 drives illumination of the first LED unit 131 to provide the first luminance with the first color temperature and/or drives illumination of the second LED unit 132 to provide the second luminance with the second color temperature.

Moreover, the driving controller 1231 of the driving circuit 123 is a constant voltage and constant current controller. By the driving controller 1231, the photo coupler 1232 and the resistors R4~R6 of the driving circuit 123 and the photo coupler 1222 of the pulse width modulation controller 122, the driving device 12 can output constant voltage and constant current while preventing from causing the over-voltage and over-current problems.

The count controller 121 further comprises a capacitor C7. In a case that the switching element 11 is turned off, the capacitor C7 can provide electricity to the flip-flop 1211 for a specified time period, so that the flip-flop 1211 is able to normally operate for the specified time period. The specified time period is determined according to the specification of the capacitor C7. That is, if the duration of the switching element 11 in the off state is longer than the specified time period, the flip-flop 1211 is disabled and fails to perform the counting task. Until the switching element 11 is turned on again, the count controller 121 re-counts the number of times the switching element 11 is turned on.

Figure 4:
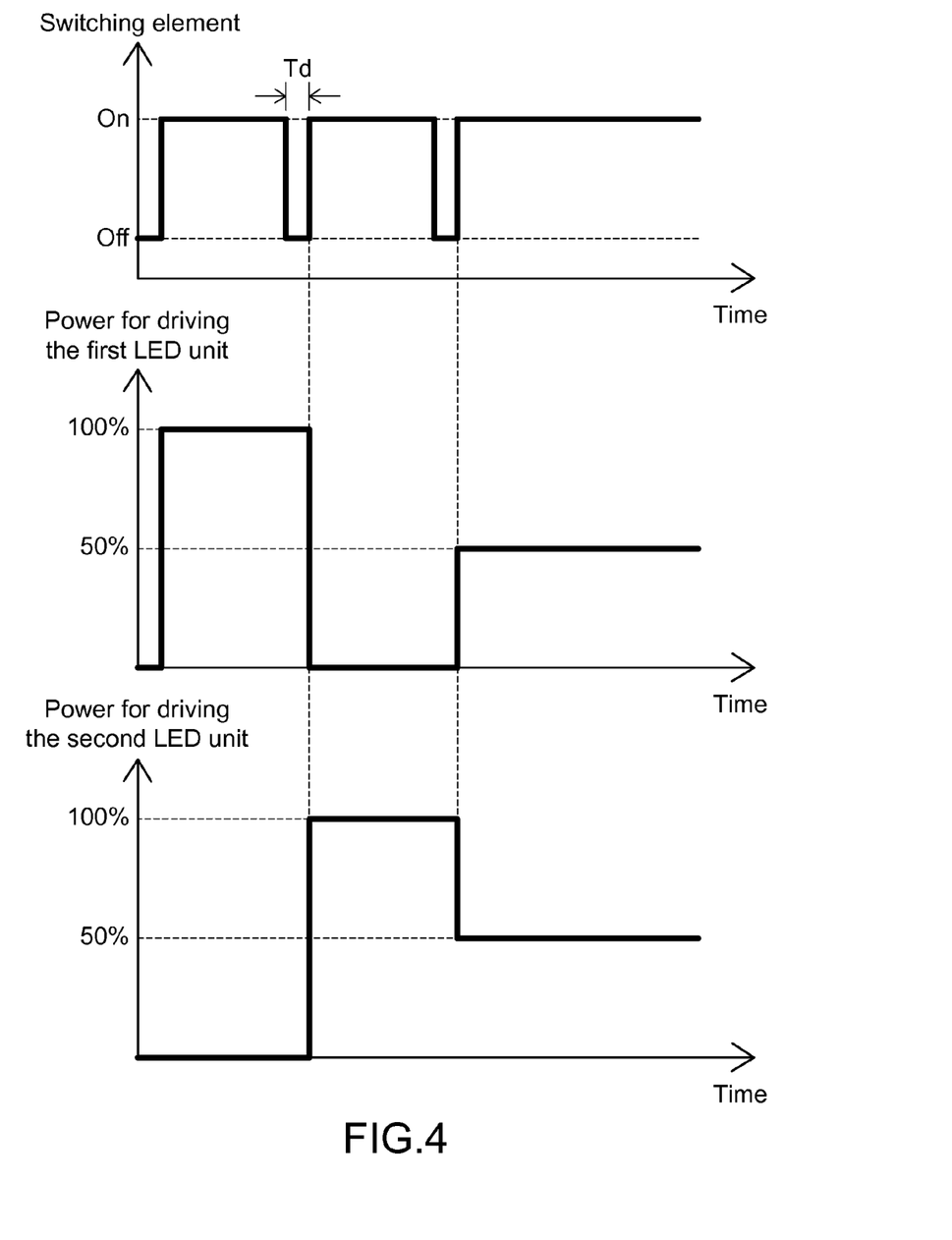
FIG. 4 is schematic timing waveform diagram illustrating operations of the lighting circuit of FIG. 2.

FIG. 4 is schematic timing waveform diagram illustrating operations of the lighting circuit of FIG. 2. As shown in FIG. 4, the pulse width modulation controller 122 outputs a pulse width modulation signal with a 100% duty cycle after the switching element 11 is turned on. It is noted that the duty cycle of the pulse width modulation signal is not limited to 100%.

In a case that the switching element 11 is turned on at the first time, the first enabling signal is outputted from the first pin Q1 of the flip-flop 1211 to the first LED unit 131. In response to the first enabling signal, the first LED unit 131 is driven to illuminate by 100% power, so that the lighting device 1 provides the first luminance with the first color temperature.

Moreover, in a case that the switching element 11 is turned off to be in the off state for the time duration shorter than the specified time period (i.e. the time interval Td between successive pulses of two switching actions is shorter than the specified time period) and then turned on at the second time, the second enabling signal is outputted from the second pin Q2 of the flip-flop 1211 to the second LED unit 132. In response to the second enabling signal, the second LED unit 132 is driven to illuminate by 100% power, so that the lighting device 1 provides the second luminance with the second color temperature.

Moreover, in a case that the switching element 11 is turned off again to be in the off state for the time duration shorter than the specified time period and then turned on at the third time, the first enabling signal is outputted from the first pin Q1 of the flip-flop 1211 to the first LED unit 131 and the second enabling signal is outputted from the second pin Q2 of the flip-flop 1211 to the second LED unit 132. In response to the first enabling signal and the second enabling signal, the first LED unit 131 and the second LED unit 132 are simultaneously driven to illuminate by 100% power. That is, each of the first LED unit 131 and the second LED unit 132 is driven by 50% power. Under this circumstance, the lighting device 1 provides a third luminance with a third color temperature, which is the combination of the first color temperature and the second color temperature. Since the first LED unit 131 and the second LED unit 132 of the lighting circuit as shown in FIG. 2 are uniformly distributed, the light with the third color temperature is pure white light with a color temperature of 4500K.

In this embodiment, only the first LED unit 131 is driven by 100% power, or only the second LED unit 132 is driven by 100%, or the first LED unit 131 and the second LED unit 132 are simultaneously driven to illuminate by 100% power. In other words, the first luminance, the second luminance and the third luminance are equal. In the lighting circuit of this embodiment, only the color temperature can be adjusted, but the luminance fails to be adjusted. Consequently, the lighting circuit needs to be further improved. Hereinafter, the lighting device capable of adjusting the color temperature and the luminance will be illustrated with reference to the exemplary lighting circuit of FIG. 3.

In the exemplary lighting circuit of FIG. 3, the count controller 121 comprises a programmed micro controller 1212. The micro controller 1212 has a trigger pin Pin, a first pin P1, a second pin P2 and an output pin Pout. The trigger pin Pin is triggered once whenever the switching element 11 is turned on once. In such way, the number of times the switching element 11 is turned on will be counted. Moreover, according to the number of times the trigger pin Pin is triggered, only a first enabling signal is outputted from the first pin P1 of the micro controller 1212, or only a second enabling signal is outputted from the second pin P2 of the micro controller 1212, or both the first enabling signal and the second enabling signal are respectively outputted from the first pin P1 and the second pin P2 of the micro controller 1212.

Moreover, according to the number of times the trigger pin Pin is triggered, the micro controller 1212 issues a light-adjusting signal to pulse width modulation controller 122. According to the light-adjusting signal, the pulse width modulation controller 122 issues a driving signal to the driving circuit 123, wherein the driving circuit 123 comprises a driving controller 1231, a photo coupler 1232, a capacitor C5 and a plurality of resistors R4~R6. In response to the pulse width modulation signal pulse width modulation signal, the driving device 12 drives illumination of the first LED unit 131 to provide the first luminance with the first color temperature and/or drives illumination of the second LED unit 132 to provide the second luminance with the second color temperature.

The functions and operating principles of the driving controller 1231 of the driving circuit 123 and the capacitor C7 of the count controller 121 of the exemplary lighting circuit of FIG. 3 are similar to those of the exemplary lighting circuit of FIG. 2, and are not redundantly described herein.

Figure 5:
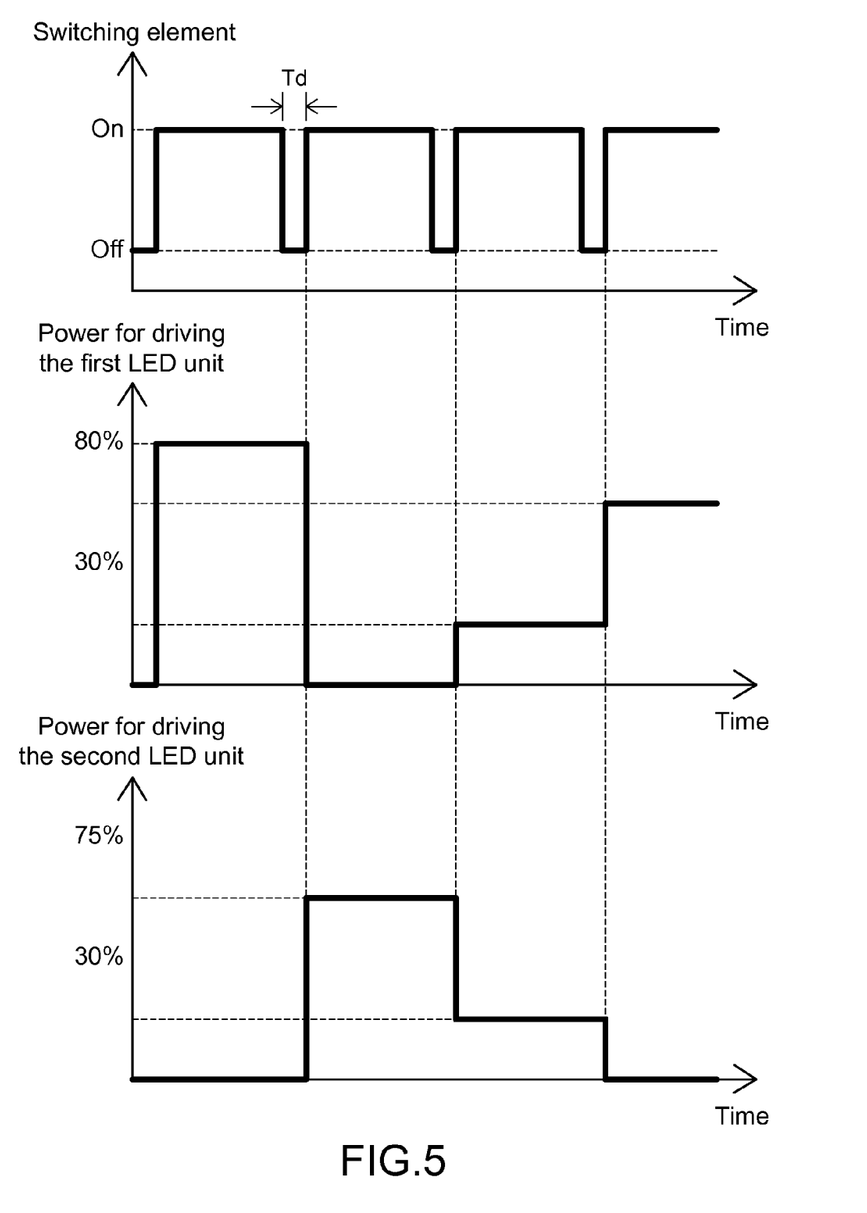
FIG. 5 is schematic timing waveform diagram illustrating operations of the lighting circuit of FIG. 3.

FIG. 5 is schematic timing waveform diagram illustrating operations of the lighting circuit of FIG. 3. In a case that the switching element 11 is turned on at the first time, the trigger pin Pin of the micro controller 1212 is triggered at the first time. Consequently, the first enabling signal is outputted from the first pin P1 of the micro controller 1212 to the first LED unit 131, and a first light-adjusting signal is outputted from the output pin Pout of the micro controller 1212 to the pulse width modulation controller 122. In response to the first light-adjusting signal, the pulse width modulation controller 122 issues a driving signal to the driving circuit 123. In this situation, the driving signal is a pulse width modulation signal with a 100% duty cycle. Consequently, the first LED unit 131 is driven to illuminate by 100% power, so that the lighting device 1 provides a first luminance with a first color temperature.

Moreover, in a case that the switching element 11 is turned off to be in the off state for the time duration shorter than the specified time period (i.e. the time interval Td between successive pulses of two switching actions is shorter than the specified time period) and then turned on at the second time, the number of times the trigger pin Pin of the micro controller 1212 is triggered is accumulated as 2. Consequently, the second enabling signal is outputted from the second pin P2 of the micro controller 1212 to the second LED unit 132. In addition, a second light-adjusting signal is outputted from the output pin Pout of the micro controller 1212 to the pulse width modulation controller 122. In response to the second light-adjusting signal, the pulse width modulation controller 122 issues a driving signal to the driving circuit 123. In this situation, the driving signal is a pulse width modulation signal with a 75% duty cycle. Consequently, the second LED unit 132 is driven to illuminate by 75% power, so that the lighting device 1 provides a second luminance with a second color temperature.

Moreover, in a case that the switching element 11 is turned off again to be in the off state for the time duration shorter than the specified time period and then turned on at the third time, the number of times the trigger pin Pin of the micro controller 1212 is triggered is accumulated as 3. Consequently, the first enabling signal is outputted from the first pin P1 of the micro controller 1212 to the first LED unit 131, and the second enabling signal is outputted from the second pin P2 of the micro controller 1212 to the second LED unit 132. In addition, a third light-adjusting signal is outputted from the output pin Pout of the micro controller 1212 to the pulse width modulation controller 122. In response to the third light-adjusting signal, the pulse width modulation controller 122 issues a driving signal to the driving circuit 123. In this situation, the driving signal is a pulse width modulation signal with a 60% duty cycle. Consequently, the first LED unit 131 and the second LED unit 132 simultaneously driven to illuminate by 60% power. That is, each of the first LED unit 131 and the second LED unit 132 is driven by 30% power. Under this circumstance, the lighting device 1 provides a third luminance with a third color temperature. Since the first LED unit 131 and the second LED unit 132 of the exemplary lighting circuit of FIG. 3 are uniformly distributed, the light with the third color temperature is pure white light with a color temperature of 4500K.

Moreover, in a case that the switching element 11 is turned off again to be in the off state for the time duration shorter than the specified time period and then turned on at the fourth time, the number of times the trigger pin Pin of the micro controller 1212 is triggered is accumulated as 4. Consequently, the first enabling signal is outputted from the first pin P1 of the micro controller 1212 to the first LED unit 131, and a fourth light-adjusting signal is outputted from the output pin Pout of the micro controller 1212 to the pulse width modulation controller 122. In response to the fourth light-adjusting signal, the pulse width modulation controller 122 issues a driving signal to the driving circuit 123. In this situation, the driving signal is a pulse width modulation signal with an 80% duty cycle. Consequently, the first LED unit 131 is driven to illuminate by 80% power, so that the lighting device 1 provides a fourth luminance with the first color temperature.

Since each of the first luminance, the second luminance, the third luminance and the fourth luminance is in direct proportion to the driving power provided by the driving device 12, the first luminance, the second luminance, the third luminance and the fourth luminance are all different. It is noted that numerous modifications and alterations may be made while retaining the teachings of the invention. That is, before the lighting device is introduced into the market, the driving power may be set according to the practical requirements. For example, depending on the practical applications, through the firmware of the programmed micro controller 1212, the manufacture may set the driving power given to the first LED unit 131 and/or the second LED unit 132 by the driving device 12 according to the number of times the switching element 11 is turned on.

However, the above lighting device 1 provides limited luminance options. That is, the user can only select a desired luminance from four fixed luminance levels, but the user fails to fine tune the selected luminance. Especially when the environment of the lighting device is frequently changed, the lighting device 1 with the limited luminance levels is not very user-friendly. For solving these problems, the present invention further provides a second embodiment of the lighting device.

Figure 6:
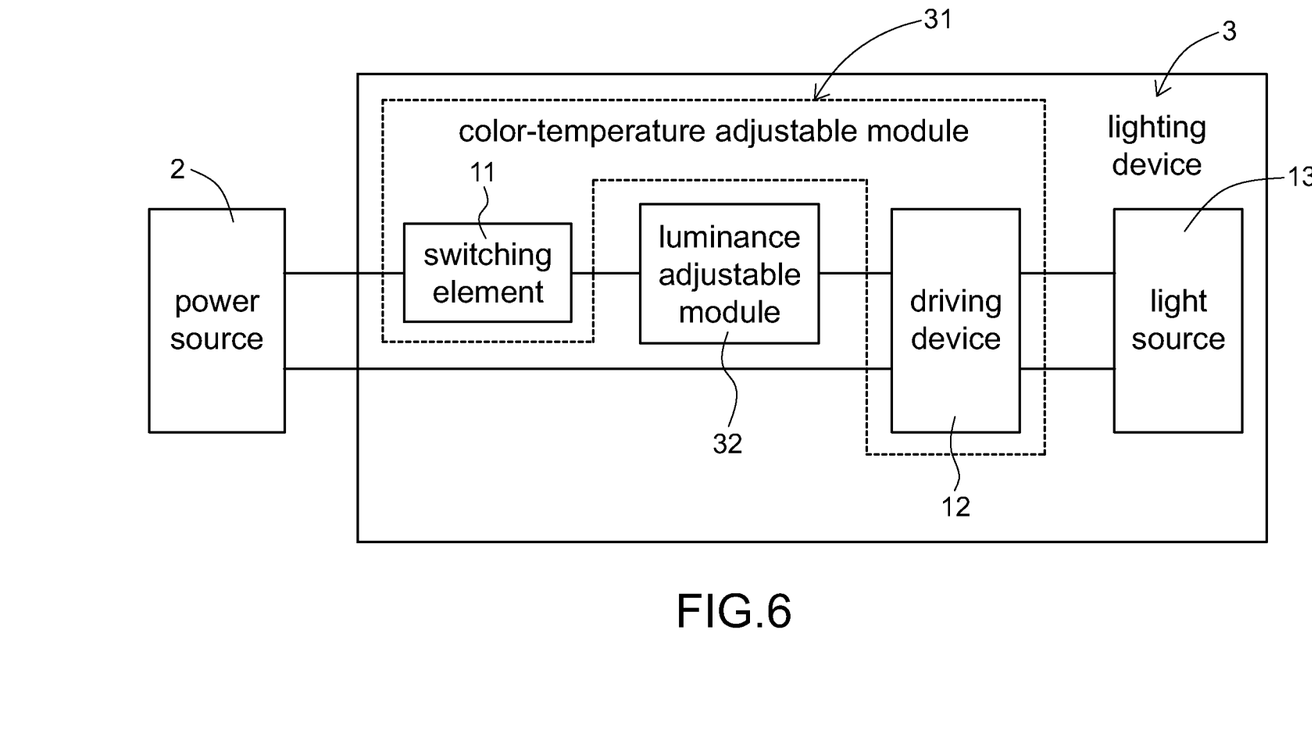
FIG. 6 is a schematic functional block diagram illustrating the concept of a lighting device according to a second embodiment of the present invention.
Figure 7:
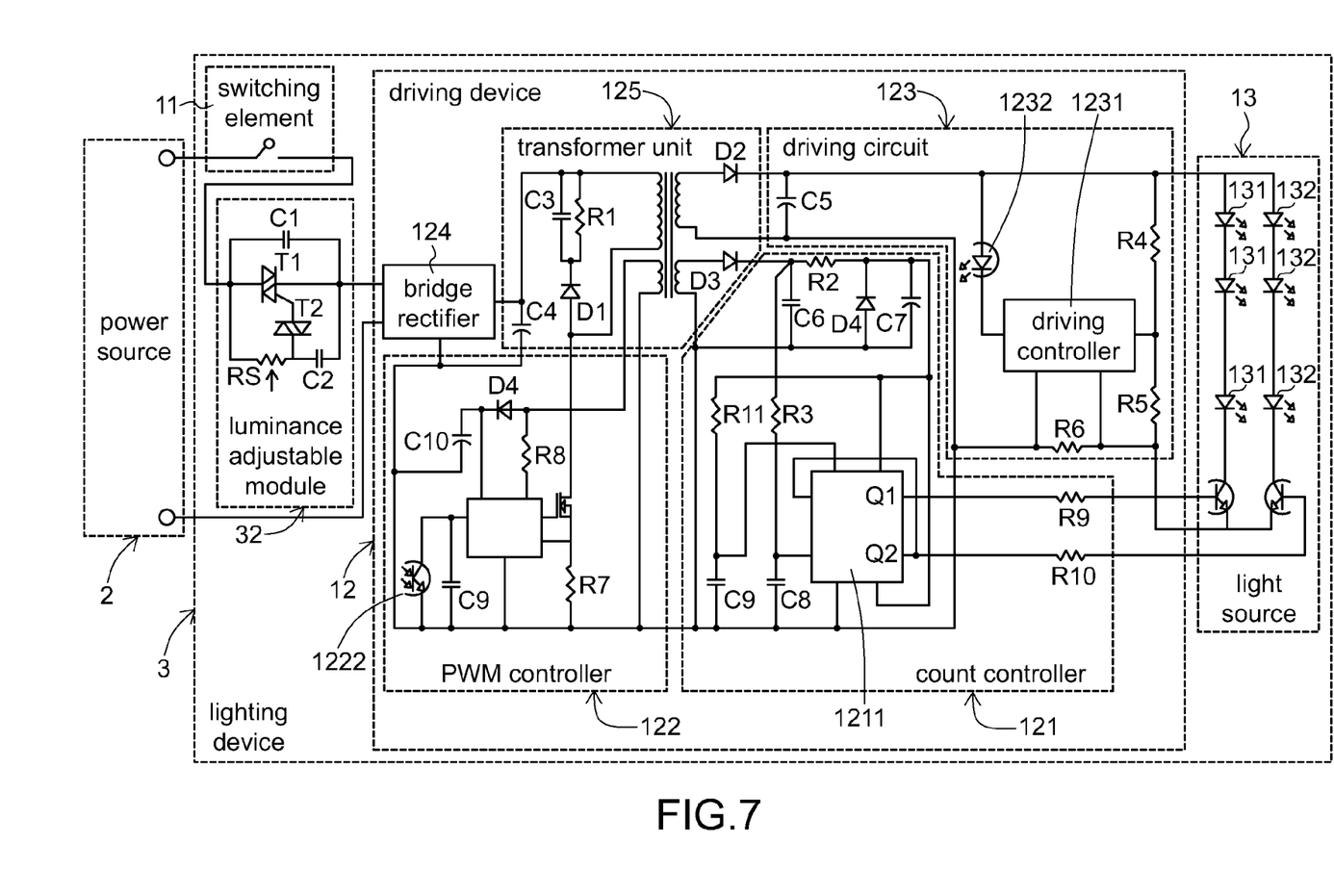
FIG. 7 schematically illustrating an exemplary lighting circuit of the lighting device of FIG. 6.

FIG. 6 is a schematic functional block diagram illustrating the concept of a lighting device according to a second embodiment of the present invention. FIG. 7 schematically illustrating an exemplary lighting circuit of the lighting device of FIG. 6. Please refer to FIGS. 6 and 7.

Except that a luminance adjustable module 32 is included in the lighting device 3 and the switching element 11 and the driving device 12 are collectively defined as a color-temperature adjustable module 31, the other components of the lighting device 3 of the second embodiment are substantially to those of the first embodiment as shown in FIG. 1, and are not redundantly described herein. The color-temperature adjustable module 31 is configured for allowing the light source to provide a plurality of luminance levels with different color temperatures. The operations of the color-temperature adjustable module 31 are similar to those of the first embodiment. In addition, the luminance adjustable module 32 is configured for fine-tuning a selected one of the luminance levels, thereby slightly increasing or decreasing the selected luminance.

In this embodiment, the luminance adjustable module 32 is electrically connected between the switching element 11 and the driving device 12. In addition, the luminance adjustable module 32 comprises a variable resistor Rs, a plurality of capacitors C1, C2, and a plurality of bidirectional triode thyristors T1, T2. In a case that the switching element 11 is turned on, an AC voltage from the power source 2 to the bridge rectifier 124 is adjusted by changing the resistance value of the variable resistor Rs. The adjusted AC voltage is converted into a DC voltage by the bridge rectifier 124, and the DC voltage is transmitted to associated components of the driving device 12. In such way, any of the plural luminance levels is changed as the resistance value of the variable resistor Rs is changed.

Moreover, the lighting device 3 of this embodiment can be applied to an indoor lighting application. An example of the lighting device 1 includes but is not limited to a household lighting lamp, a commercial lighting lamp, a reading lamp or a bedside lamp.

Figure 8:
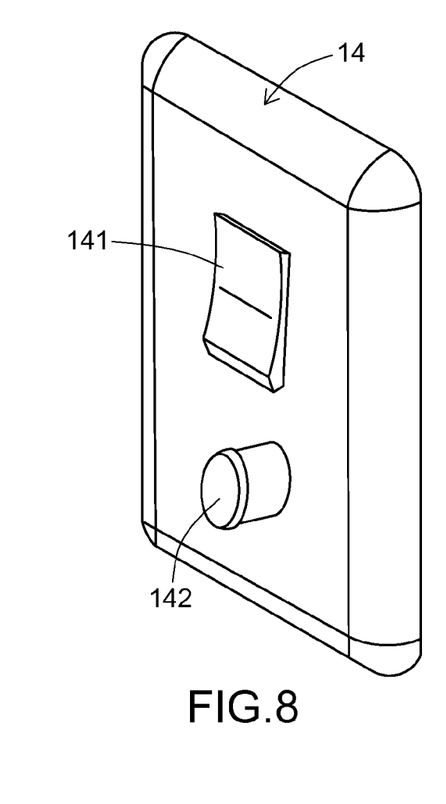
FIG. 8 schematically illustrates an exemplary operating interface of the lighting device of FIG. 6.
Figure 9:
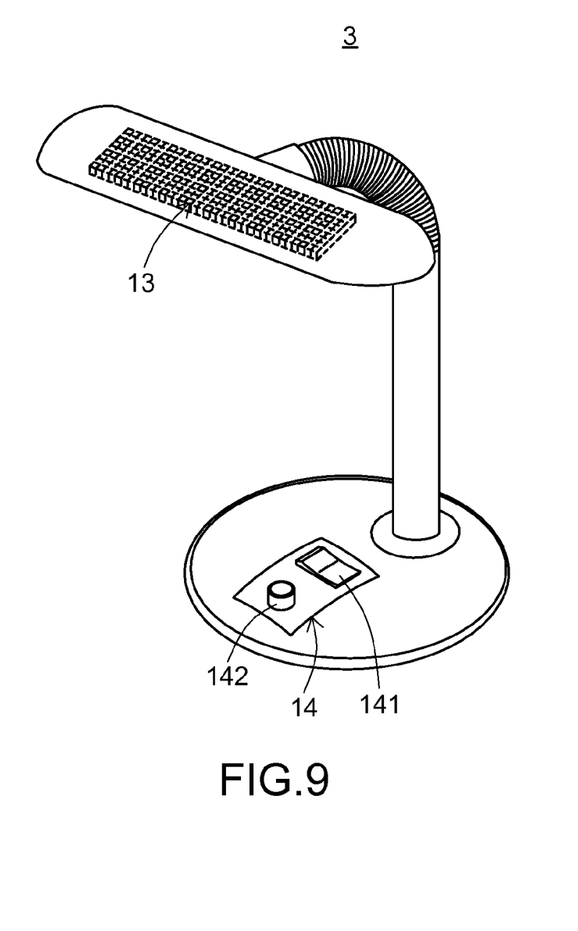
FIG. 9 schematically illustrates a reading lamp using the operating interface of FIG. 8.

Hereinafter, the applications of the lighting device of the present invention will be illustrated with reference to FIGS. 8 and 9. FIG. 8 schematically illustrates an exemplary operating interface of the lighting device of FIG. 6. FIG. 9 schematically illustrates a reading lamp using the operating interface of FIG. 8. As shown in FIG. 8, the operating interface 14 comprises a switching part 141 and a luminance fine-tuning part 142. The switching part 141 is for example a switching element 11 that is installed on an indoor wall. Alternatively, as shown in FIG. 9, the switching part 141 is an original switching element of a reading lamp 3. In addition, the luminance fine-tuning part 142 is a knob-type controlling element. By pressing the switching part 141 to turn on the switching element 11 and changing the number of times a switching element is turned on, the light with desired color temperature and luminance is produced according to the user's requirements or the surrounding requirements.

Moreover, the user may rotate the luminance fine-tuning part 142 of the operating interface 14 to change the resistance value of the variable resistor Rs, thereby fine-tuning the selected luminance. That is, by rotating the luminance fine-tuning part 142, the selected luminance is slightly increased or decreased, and thus the most satisfactory luminance level can be achieved.

The light source used in the lighting device of the present invention will be illustrated in more details as follows. In the above embodiments, the light source 13 of the lighting device 1 comprises a first LED unit 131 for outputting light with a first color temperature and a second LED unit 132 for outputting light with a second color temperature. Nevertheless, the light source 13 of the lighting device 1 may comprise one or more additional LED units for outputting light with various color temperatures. In other words, the lighting device can provide diversified color temperatures and luminance levels to be selected by the user while retaining the teachings of the invention. It is noted that numerous modifications and alterations may be made by referring to the above-mentioned driving principles and concepts.

In some embodiments, the first LED unit 131 comprises a plurality of light emitting diodes (LEDs) for outputting the light with the first color temperature, and the second LED unit 132 also comprises a plurality of light emitting diodes (LEDs) for outputting the light with the second color temperature. However, if the LEDs of an individual LED unit for outputting the light with the same color temperature are very centralized, the light with the first color temperature and the light with the second color temperature may produce deteriorated light-mixing efficacy. For effectively enhancing the quality of the light with the third color temperature, it is preferred that the LEDs for outputting light with different color temperatures are uniformly distributed and arranged. Two ways of uniformly arranging the LEDs with different color temperatures will be illustrated in more details as follows.

A first way of uniformly arranging the LEDs with different color temperatures is based on the following criteria. In the light source 13 of the lighting device 1, all of the LEDs are symmetrically arranged with respect to a symmetry axis. In addition, every two LEDs which are symmetrically arranged at opposite sides of the symmetry axis may output light with the same color temperature. Moreover, the LEDs of a LED arrangement group at each side of the symmetry axis may be divided into at least two LED arrangement subgroups. The LEDs of each LED arrangement subgroup may be linearly or non-linearly arranged. Moreover especially, every two adjacent LEDs of each LED arrangement subgroup output light with different color temperatures.

More preferably, every two adjacent LEDs at the periphery (i.e. at the outermost region) of all LEDs output light with different color temperatures.

Figure 10:
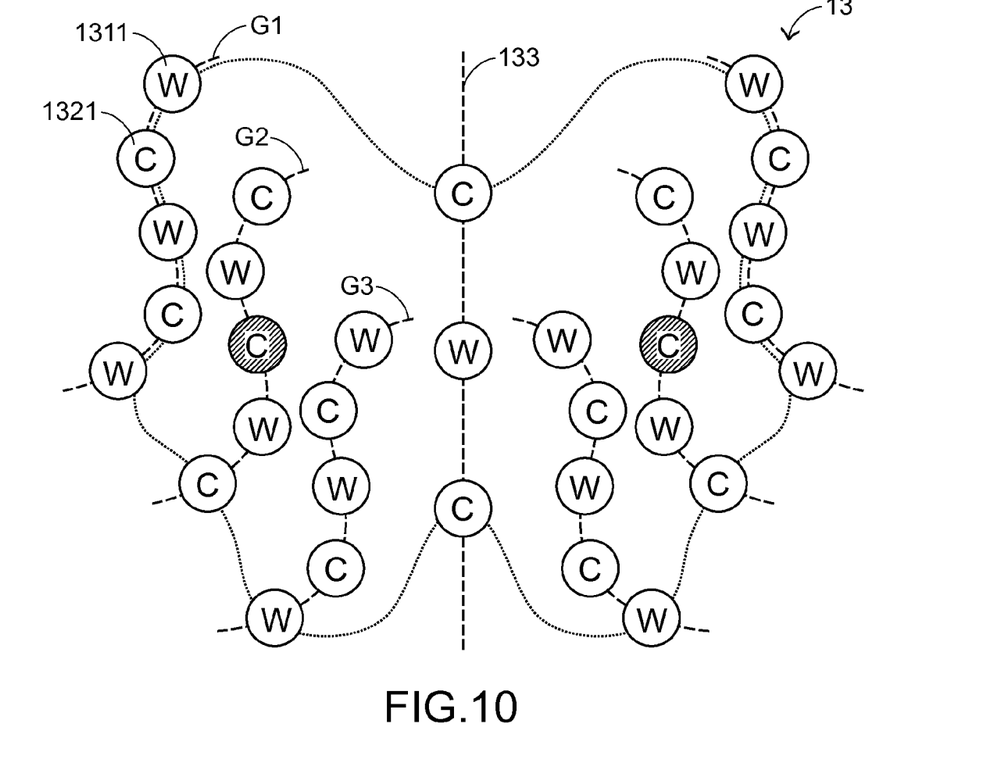
FIG. 10 schematically illustrates a first exemplary arrangement of the LEDs of the light source used in the lighting device of the present invention.

FIG. 10 schematically illustrates a first exemplary arrangement of the LEDs of the light source used in the lighting device of the present invention. In FIG. 10, the LED 1311 indicated by the symbol "W" may output the light with the first color temperature, and the LED 1321 indicated by the symbol "C" may output the light with the second color temperature. All of the LEDs 1311 and 1321 are symmetrically arranged with respect to a symmetry axis 133. In addition, every two LEDs which are symmetrically arranged at opposite sides of the symmetry axis 133 output light with the same color temperature. For example, as shown in FIG. 10, the two LEDs which are denoted by the symbol "C" and marked by oblique lines output light with the same color temperature. Moreover, every group of LEDs at each side of the symmetry axis 133 may be divided into three LED arrangement subgroups G1, G2 and G3. For clarification, the LEDs belonging to the same LED arrangement subgroup are connected by the same dashed line. In this embodiment, the LEDs 1311 and 1321 of each LED arrangement subgroup are in an S-shaped arrangement or an inverted S-shaped arrangement, wherein every two adjacent LEDs of the same LED arrangement subgroup output light with different color temperatures.

For more uniformly arranging the LEDs 1311 and 1321 of different color temperatures, every two adjacent LEDs at the periphery (i.e. at the outermost region) of all LEDs 1311 and 1321 output light with different color temperatures. For clarification, the LEDs arranged at the outermost region are connected by a dotted line. Moreover, in this embodiment, some LEDs 1311 and 1321 are arranged along the symmetry axis 133, wherein every two adjacent LEDs of the LEDs 1311 and 1321 along the symmetry axis 133 output light with different color temperatures. Alternatively, in some embodiments, the LEDs 1311 and 1321 arranged along the symmetry axis 133 may be exempted.

A second way of uniformly arranging the LEDs with different color temperatures is based on the following criteria. In the light source 13 of the lighting device 1, all of the LEDs are arranged in an array or a non-array. In a case that all of the LEDs are arranged in an array, every two adjacent LEDs output light with different color temperatures. Whereas, in a case that all of the LEDs are arranged in a non-array, these LEDs are divided into at least two LED arrangement groups. All LEDs of each LED arrangement group are linearly arranged. Moreover, every two LED arrangement groups may be parallel with each other, or not parallel with each other. Moreover especially, every two adjacent LEDs of each LED arrangement group output light with different color temperatures.

More preferably, all of the LEDs are symmetrically arranged with respect to a symmetry axis. In addition, every two LEDs which are symmetrically arranged at opposite sides of the symmetry axis may output light with the same color temperature. Moreover, every two adjacent LEDs at the periphery (i.e. at the outermost region) of all LEDs output light with different color temperatures.

Figure 11:
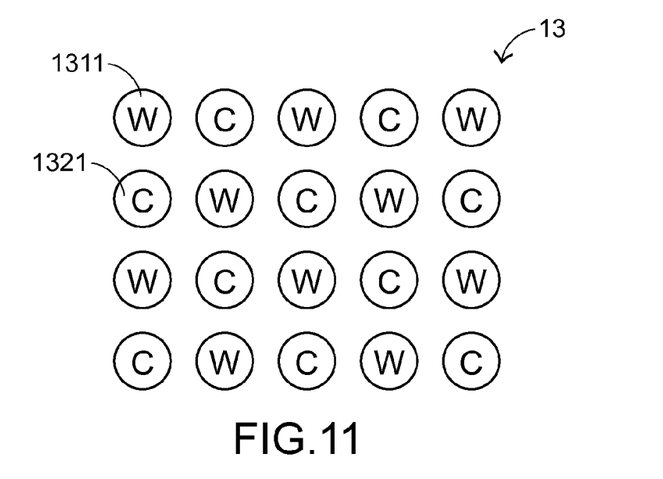
FIG. 11 schematically illustrates a second exemplary arrangement of the LEDs of the light source used in the lighting device of the present invention.

FIG. 11 schematically illustrates a second exemplary arrangement of the LEDs of the light source used in the lighting device of the present invention. Similarly, in FIG. 9, the LED 1311 indicated by the symbol "W" may output the light with the first color temperature, and the LED 1321 indicated by the symbol "C" may output the light with the second color temperature. All of the LEDs 1311 and 1321 are arranged in an array of four rows and five columns. Every two LEDs which output the light with the first color temperature do not neighbor with each other, and every two LEDs which output the light with the second color temperature do not neighbor with each other.

Figure 12:
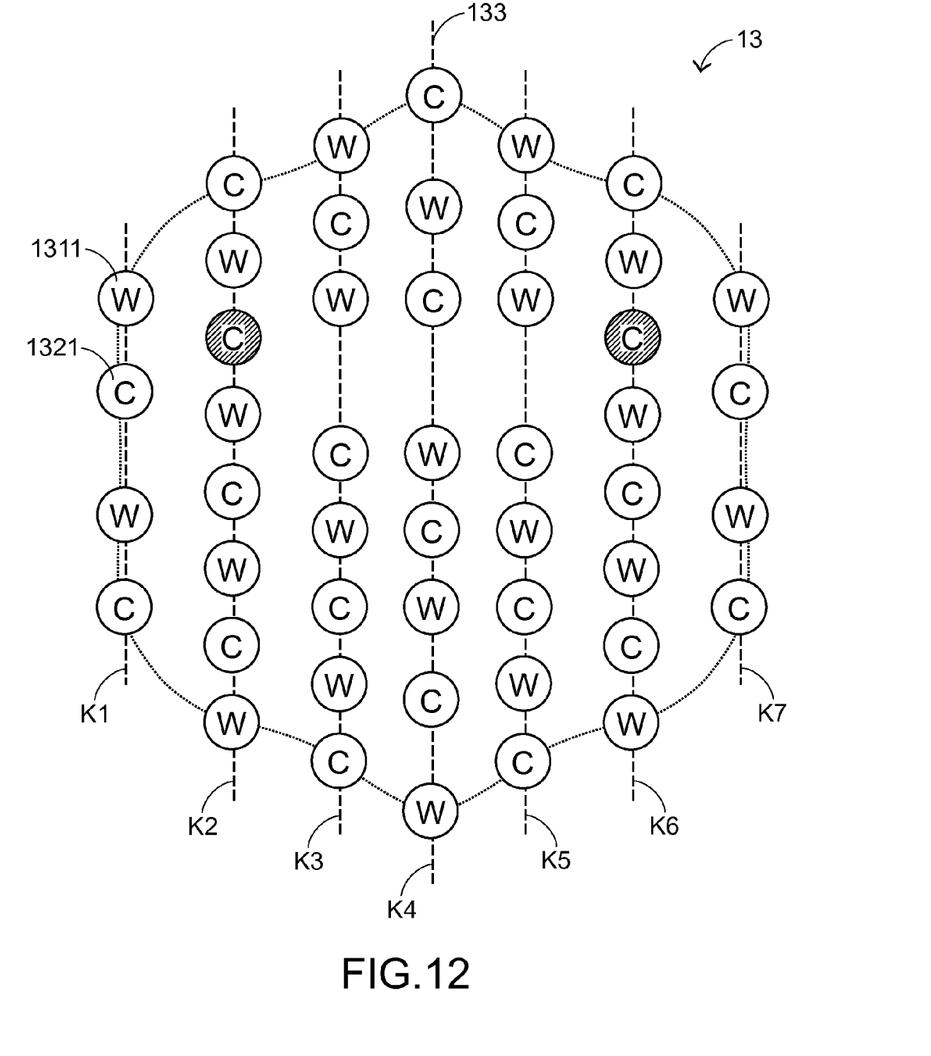
FIG. 12 schematically illustrates a third exemplary arrangement of the LEDs of the light source used in the lighting device of the present invention.

FIG. 12 schematically illustrates a third exemplary arrangement of the LEDs of the light source used in the lighting device of the present invention. Similarly, in FIG. 10, the LED 1311 indicated by the symbol "W" may output the light with the first color temperature, and the LED 1321 indicated by the symbol "C" may output the light with the second color temperature. In this embodiment, all of the LEDs 1311 and 1321 are arranged in a non-array. These LEDs 1311 and 1321 are divided into six LED arrangement groups K1~K7. For clarification, the LEDs belonging to the same LED arrangement group are connected by the same dashed line. In this embodiment, the LEDs of each LED arrangement group are in a linear arrangement, and every two LED arrangement groups are parallel with each other, wherein every two adjacent LEDs of the same LED arrangement group output light with different color temperatures.

For more uniformly arranging the LEDs 1311 and 1321 of different color temperatures, every two adjacent LEDs at the periphery (i.e. at the outermost region) of all LEDs 1311 and 1321 output light with different color temperatures. For clarification, the LEDs arranged at the outermost region are connected by a dotted line. Moreover, in this embodiment, all of the LEDs 1311 and 1321 are symmetrically arranged with respect to a symmetry axis 133. In addition, every two LEDs which are symmetrically arranged at opposite sides of the symmetry axis 133 output light with the same color temperature. For example, as shown in FIG. 8, the two LEDs which are denoted by the symbol "C" and marked by oblique lines output light with the same color temperature. Moreover, in this embodiment, some LEDs 1311 and 1321 are arranged along the symmetry axis 133, wherein every two adjacent LEDs of the LEDs 1311 and 1321 along the symmetry axis 133 output light with different color temperatures. Alternatively, in some embodiments, the LEDs 1311 and 1321 arranged along the symmetry axis 133 may be exempted.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lighting device, comprising:
    a light source at least comprising a first light emitting diode unit for outputting light with a first color temperature and a second light emitting diode unit for outputting light with a second color temperature;
    a color-temperature adjustable module comprising a switching element coupled with a power source and a driving device electrically connected between said switching element and said light source, wherein according to a number of times said switching element is turned on, said driving device generates a first enabling signal to said first light emitting diode unit and/or generates a second enabling signal to said second light emitting diode unit, wherein said first light emitting diode unit provides a first luminance with said first color temperature in response to said first enabling signal, and/or said second light emitting diode unit provides a second luminance with said second color temperature in response to said second enabling signal; and
    a luminance adjustable module for fine tuning said first luminance and/or said second luminance outputted from said color-temperature adjustable module, thereby slightly increasing or decreasing said first luminance and/or said second luminance.

2. The lighting device according to claim 1 wherein said driving device comprises:
    a count controller for counting said number of times said switching element is turned on, thereby correspondingly outputting said first enabling signal to said first light emitting diode unit and/or outputting said second enabling signal to said second light emitting diode unit; and
    a driving circuit for driving illumination of said first light emitting diode unit to provide said first luminance with said first color temperature and/or driving illumination of said second light emitting diode unit to provide said second luminance with said second color temperature.

3. The lighting device according to claim 2 wherein said count controller comprises a programmed micro controller or a flip-flop, wherein when the duration of said switching element in an off state exceeds a specified time period, said number of times said switching element is turned on is re-counted by said count controller, and wherein said count controller further comprises a capacitor for providing electricity to maintain a normal operation of said count controller within said specified time period.

4. The lighting device according to claim 2 wherein said count controller further issues a light-adjusting signal according to said number of times said switching element is turned on, and said driving device further comprises a pulse width modulation controller for receiving said light-adjusting signal and generating a driving signal in response to said light-adjusting signal, wherein in response to said driving signal, said light source is driven by said driving circuit to provide a corresponding luminance.

5. The lighting device according to claim 4 wherein if said first luminance and said second luminance are identical, said first light emitting diode unit and said second light emitting diode unit are simultaneously driven in response to said driving signal, and if said first luminance and said second luminance are different, either said first light emitting diode unit or said second light emitting diode unit is driven in response to said driving signal.

6. The lighting device according to claim 4 wherein said driving signal is a pulse width modulation signal, whose duty cycle is one selected from a group consisting of 100%, 80%, 75%, 60%, and 50%.

7. The lighting device according to claim 1 wherein said lighting device is used in an indoor lighting application, and said lighting device is a household lighting lamp, a commercial lighting lamp, a reading lamp or a bedside lamp.

8. The lighting device according to claim 1 wherein light emitting diodes of said first light emitting diode unit and said second light emitting diode unit are divided into two light emitting diode arrangement groups symmetrically arranged at opposite sides with respect to a symmetry axis, so that every two light emitting diodes symmetrically arranged at opposite sides of said symmetry axis output light with the same color temperature, wherein said light emitting diodes in each of said light emitting diode arrangement groups are divided into at least two light emitting diode arrangement subgroups, wherein every two adjacent light emitting diodes in the same light emitting diode arrangement subgroup output light with different color temperatures.

9. The lighting device according to claim 8 wherein said light emitting diodes in the same light emitting diode arrangement subgroup are linearly or non-linearly arranged.

10. The lighting device according to claim 1 wherein light emitting diodes of said first light emitting diode unit and said second light emitting diode unit are allocated as an array, and every two adjacent light emitting diodes output light with different color temperatures.

11. The lighting device according to claim 1 wherein said luminance adjustable module further comprises a variable resistor, wherein said first luminance and/or said second luminance is increased or decreased by changing a resistance value of said variable resistor.

12. The lighting device according to claim 11 wherein said luminance adjustable module further comprises a knob-type controlling element, wherein when said knob-type controlling element is rotated by a user, said resistance value of said variable resistor is changeable.

13. A lighting device, comprising:
    a lighting part at least comprising:
        a first light emitting diode unit for outputting light with a first color temperature;
        a second light emitting diode unit for outputting light with a second color temperature; and
        a driving device for driving illumination of said first light emitting diode unit to provide a first luminance with said first color temperature and/or driving illumination of said second light emitting diode unit to provide said second luminance with said second color temperature;

a switching part coupled with a power source and electrically connected with said lighting part, wherein when said switching part is turned on for a specified number of times by a user, said first luminance with said first color temperature, said second luminance with said second color temperature or a third luminance with a combination of said first color temperature and said second color temperature is selectively outputted from said lighting part; and a luminance fine-tuning part, wherein after one of said first luminance, said second luminance and said third luminance is selected by said user, said selected one of said first luminance, said second luminance and said third luminance is slightly increased or decreased by operating said luminance fine-tuning part.

14. The lighting device according to claim 13 wherein said driving device comprises:

a count controller for counting said number of times said switching part is turned on, thereby outputting said first enabling signal to said first light emitting diode unit and/or outputting said second enabling signal to said second light emitting diode unit; and a driving circuit for driving illumination of said first light emitting diode unit to provide said first luminance with said first color temperature and/or driving illumination of said second light emitting diode unit to provide said second luminance with said second color temperature, wherein said first light emitting diode unit provides said first luminance with said first color temperature in response to said first enabling signal, and/or said second light emitting diode unit provides said second luminance with said second color temperature in response to said second enabling signal.

15. The lighting device according to claim 13 wherein said count controller further issues a light-adjusting signal according to said number of times said switching part is turned on, and said driving device further comprises a pulse width modulation controller for receiving said light-adjusting signal and generating a driving signal in response to said light-adjusting signal, wherein in response to said driving signal, said lighting part is driven by said driving circuit to provide a corresponding luminance.

16. The lighting device according to claim 13 wherein light emitting diodes of said first light emitting diode unit and said second light emitting diode unit are divided into two light emitting diode arrangement groups symmetrically arranged at opposite sides with respect to a symmetry axis, so that every two light emitting diodes symmetrically arranged at opposite sides of said symmetry axis output light with the same color temperature, wherein said light emitting diodes in each of said light emitting diode arrangement groups are divided into at least two light emitting diode arrangement subgroups, wherein every two adjacent light emitting diodes in the same light emitting diode arrangement subgroup output light with different color temperatures.

17. The lighting device according to claim 13, wherein light emitting diodes of said first light emitting diode unit and said second light emitting diode unit are allocated as an array, and every two adjacent light emitting diodes output light with different color temperatures.

18. The lighting device according to claim 13 wherein said luminance fine-tuning part is a knob-type controlling element, wherein when said knob-type controlling element is rotated by said user, said resistance value of said variable resistor is changeable.

19. The lighting device according to claim 13 wherein said driving signal is a pulse width modulation signal, whose duty cycle is one selected from a group consisting of 100%, 80%, 75%, 60%, and 50%.

20. The lighting device according to claim 13 wherein if said first luminance and said second luminance are identical, said first light emitting diode unit and said second light emitting diode unit are simultaneously driven in response to said driving signal, and if said first luminance and said second luminance are different, either said first light emitting diode unit or said second light emitting diode unit is driven in response to said driving signal.

* * * * *